May 30, 1939.     R. G. LE TOURNEAU ET AL     2,160,480
FEED CONTROL FOR WELDING RODS
Filed Feb. 28, 1938
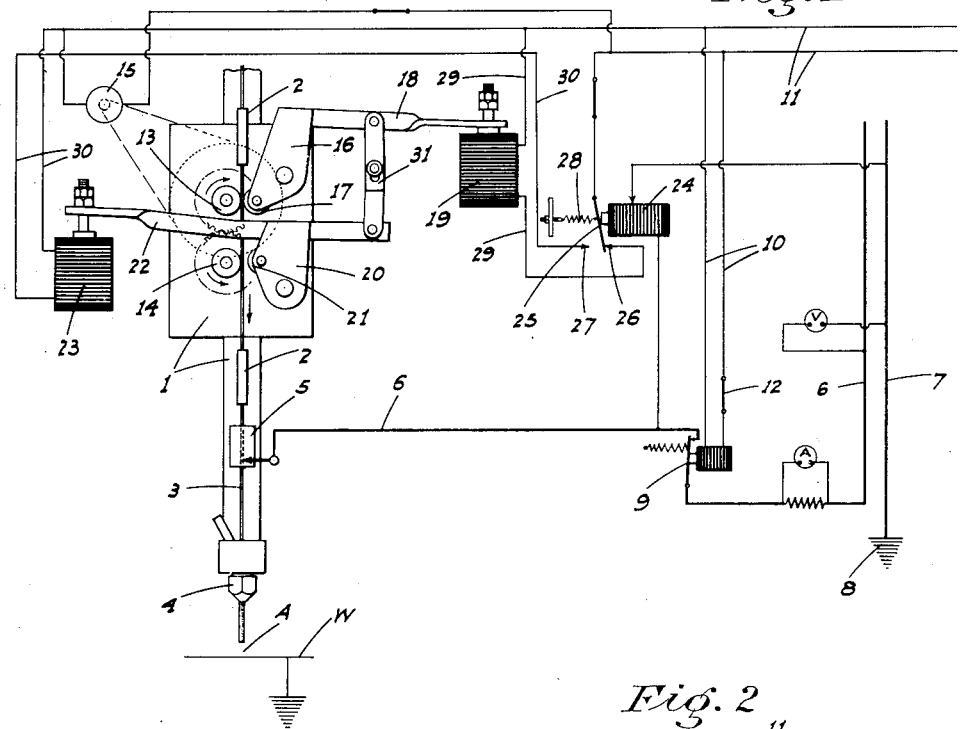
*Fig. 1*
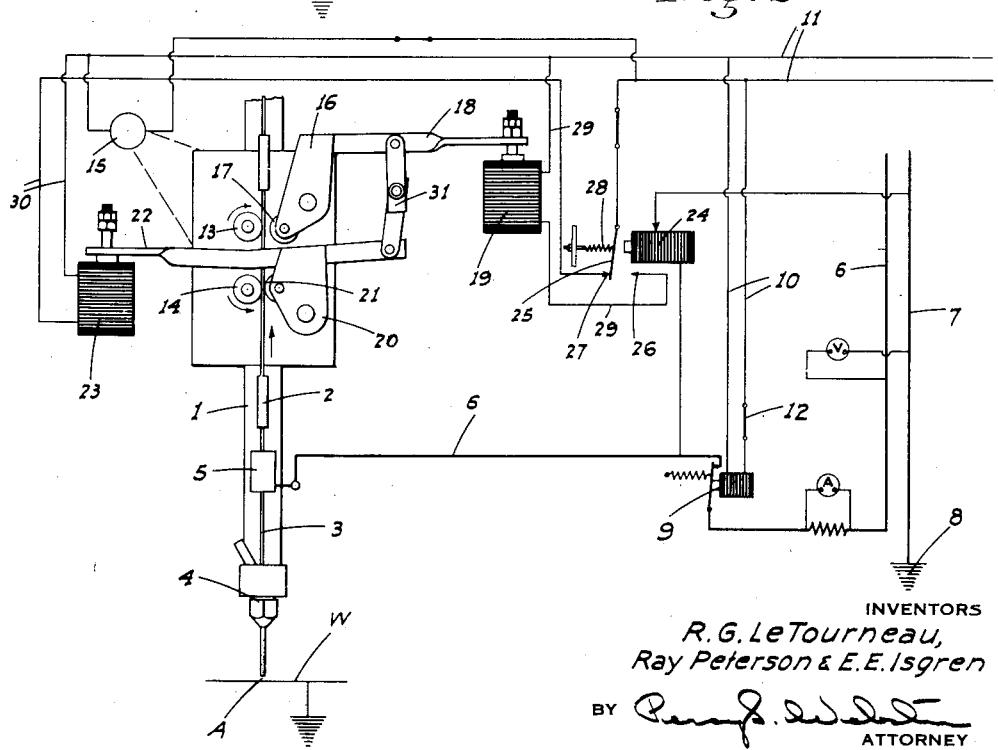
*Fig. 2*
INVENTORS
R. G. LeTourneau,
Ray Peterson & E. E. Isgren
BY 
ATTORNEY Patented May 30, 1939

2,160,480

UNITED STATES PATENT OFFICE 2,160,480

FEED CONTROL FOR WELDING RODS

Robert G. Le Tourneau, Ray Peterson, and Elmer E. Isgren, Peoria, Ill., assignors to R. G. Le Tourneau, Inc., a corporation of California Application February 28, 1938, Serial No. 192,930

2 Claims. (Cl. 219—8)

This invention relates to automatic welding machines, and particularly to the feeding of the welding rod which is also one electrode in the welding circuit, and which is consumed or transferred to the weld.

The voltage of the welding current varies according to the length of the arc between the electrode rod and the work, the voltage dropping as the arc is shortened (by a feed rate greater than the consumption rate of the rod) and rising as the length of the arc is increased. With this fact in mind and utilizing the same, it is the principal object of our invention to control the feeding of the rod by change in the welding current voltage, in such a manner that the length of the arc will be maintained substantially constant.

It is also an object of the invention to provide a means, incorporated in the control means, by which the desired working or constant arc length may be altered to suit different conditions.

A further object is to provide a simple form of combination mechanical-electrical apparatus for the purpose for which it is designed.

These objects we accomplish by means of such structure and relative arrangement of parts as will fully appear by a perusal of the following specification and claims.

In the drawing similar characters of reference indicate corresponding parts in the several views:

Figure 1 is a diagram of the control apparatus showing the position of the parts when the rod is being fed toward the work.

Figure 2 is a similar view but showing the position of the parts when the rod is being moved away from the work.

Referring now more particularly to the characters of reference on the drawing, the electric welder includes a vertical frame unit 1 having spaced guides 2 for the welding rod 3. At its lower end, the rod passes through a flux applying device 4 as shown in our copending application Serial No. 192,014, filed Feb. 23, 1938. A short distance above the box the rod passes through a contact box 5 where sliding contact is made with one wire 6 of the welding circuit as indicated in Fig. 1. The other wire 7 of said circuit is grounded as at 8, as is the work W on which the weld is to be made, as is common and standard practice.

A magnetic switch 9 is interposed in wire 6, current to said switch being supplied by wires 10 leading from common 110 volt supply wires 11, a hand switch 12 being interposed in one wire 10.

The rod feed mechanism comprises upper and lower feed rolls 13 and 14 mounted on frame 1 and disposed alongside the rod 3 between guides 2. These rolls are connected so as to rotate in opposite directions as indicated and are constantly driven by suitable connections with an electric motor 15 deriving its current from supply line 11 as shown. In the present arrangement the roll 13 feeds the rod down, while roll 14 feeds it up or retracts it from the work.

Pivoted on frame 1 on the side of the rod opposite roll 13 is a bracket 16 on which, below the pivot and in line with roll 13, is mounted a pressure roll 17. An arm 18 rigid with the bracket extends from the side thereof opposite roll 17 and overhangs an electromagnet 19. This structure is arranged so that when the magnet is deenergized, the roll 17 is clear of rod 3, but when the magnet is energized and the arm 18 drawn down, the roll 17 will be swung toward the feed roll 13, and will force rod 3 into driving or feeding engagement with said roll.

Another bracket 20 is pivoted on the frame 1 on the same side of the rod as bracket 16 but below the latter. Mounted on the bracket 20 above its pivot and in line with roll 14 is a pressure roll 21. An arm 22 rigid with the bracket 20 extends therefrom in a direction to cause the roll 21 to be swung against the rod when the arm is lowered, and overhangs another electromagnet 23. As with the other pressure roll 17, roll 21 is clear of rod 3 when magnet 23 is deenergized, but is brought against the rod when said magnet is energized to cause the rod to be drivingly engaged by feed roll 14.

The magnets are alternately energized by fluctuations from a predetermined voltage in the welding circuit, as caused by differences in the length of arc A between the rod and the work, by the following means:

An electromagnet 24 is adjustably connected to welding circuit wires 6 and 7 as indicated, so as to provide a variable resistance. This magnet operates a switch blade 25 connected to one wire 11 and movable between two contact points 26 and 27. When the magnetic strength is at or above a predetermined value, the blade engages contact 26. When the strength of the magnet drops below said value, a spring 28, adjustable as to tension, pulls the switch blade into engagement with contact 27. Since the strength of the magnet as well as the effective pull of the spring may be varied as desired, the voltage in the circuit at the arc necessary to cause the spring to act and reverse the switch blade may be varied also. The arc may thus be maintained at different lengths as may be desired.

Magnet 19 is connected to the other wire 11 and to contact 26 by wires 29, while magnet 23 is connected to said other wire 11 and to contact 27 by wires 30.

In operation, it will be seen that as long as the voltage at arc A gives magnet 24 a strength in excess of the resistance of spring 28, the magnet will hold blade 25 engaged with contact 26. The circuit through magnet 19 will then remain closed, causing feed roll 13 to advance the rod 3 toward the work.

If the rate of feed is in excess of the rate of consumption of the rod, causing the arc to be shortened and the voltage to drop below the strength for which it is set, the spring 28 will act to draw the switch blade away from contact 26 and against contact 27. The circuit to magnet 19 will then be opened and the circuit to magnet 23 closed. The feeding action of roll 13 will thus be halted, while the roll 14 will now act on the rod to draw the same up.

Positive disengagement of one pressure roll from the rod, by the energization of the other magnet, is obtained by the use of a compression linkage 31 between arms 18 and 22 at the proper points.

As soon as the retraction of the rod increases the length of the arc to a point such that the voltage for the operation of magnet 24 is increased to the extent necessary to overcome spring 28, magnet 23 is deenergized and magnet 19 again energized, so that the rod is again fed down. In actual operation, the structure functions so that the actual variation in arc length is very slight and is practically held constant.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a feed control mechanism for a welding rod, separate driven feed rolls arranged to engage and feed the rod in opposite directions, idler pressure rolls mounted in opposition to the feed rolls in position to cooperate with the rod to cause either feed roll to be drivingly engaged with the rod, separate movable members on which said pressure rolls are mounted, separate electrical means to act on said members alternatively and move the same in a direction to cause the corresponding pressure rolls to be pressed against the rod, and a mechanical connection between the members arranged to cause one member to be moved to withdraw its roll from the rod when the other member is moved by its electrical means.

2. In a feed control mechanism for a welding rod, separate feed rolls driven in opposite directions and mounted in position to engage the rod on opposite sides, at spaced points in the length thereof, pressure rolls on the opposite side of the rod in opposed and cooperating relationship to the feed rolls, a member pivoted intermediate its ends in a fixed position and on which one pressure roll is mounted, electrical means applied to the member to swing the same in a direction such that the roll thereon will be pressed against the rod, another member pivoted intermediate its ends in a fixed position and on which the other pressure roll is mounted, other electrical means applied to said other member to swing the same in a direction such that the roll thereon will be pressed against the rod and a link connecting the members in such relation to their pivot points as to cause one member to be swung in a direction such that the roll thereon will be moved away from the rod when the other member is moved by its electrical means, and vice versa.

ROBERT G. LE TOURNEAU.
RAY PETERSON.
ELMER E. ISGREN.